Dec. 20, 1966  H. M. GREENE, JR  3,293,594
RADIATING ENERGY DETECTION SYSTEM
Filed Jan. 10, 1964  2 Sheets-Sheet 1
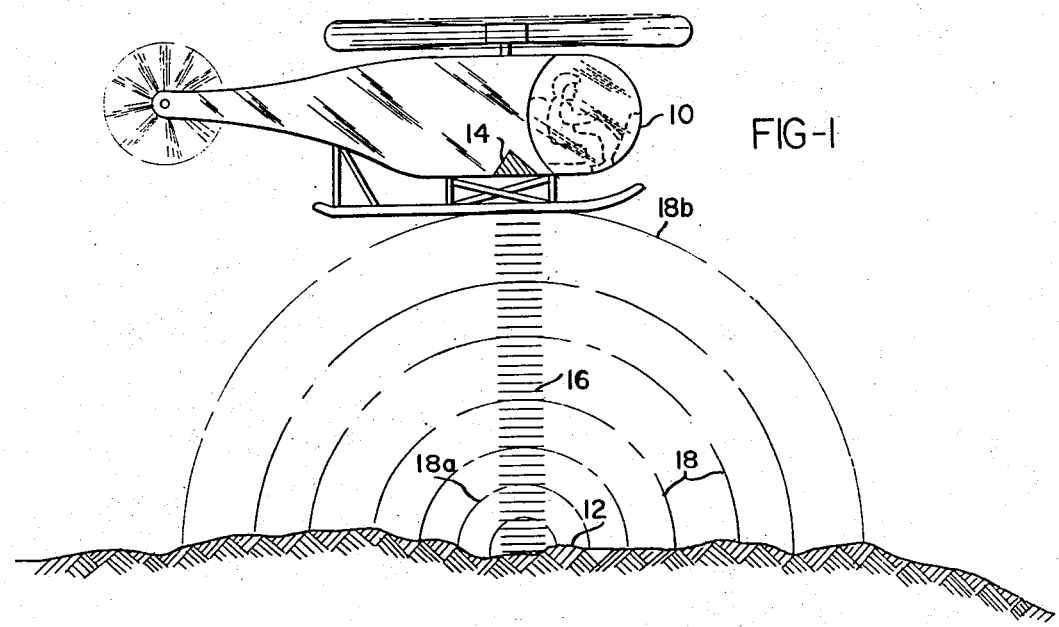
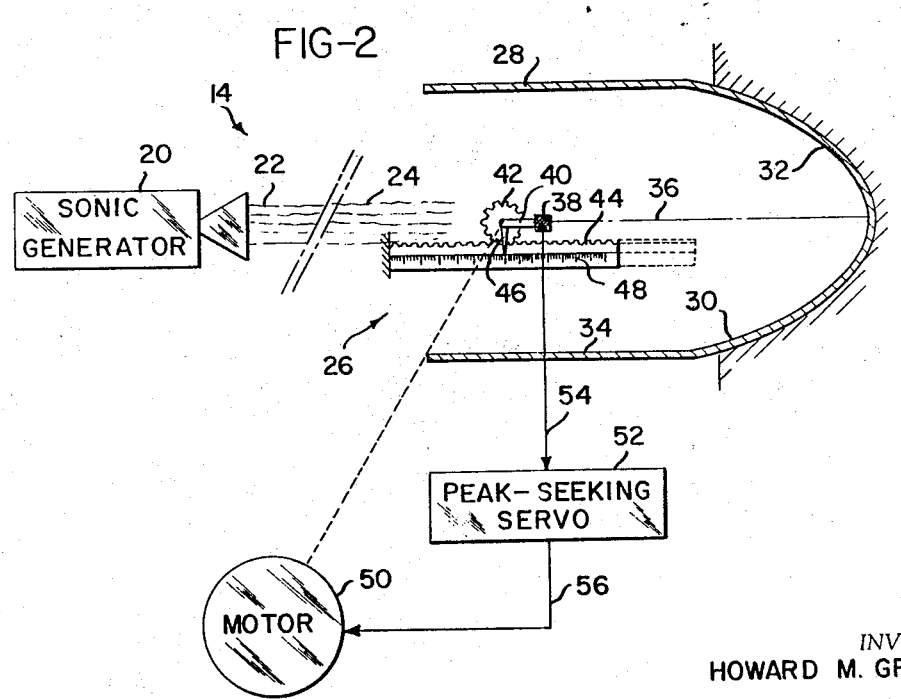
INVENTOR.
HOWARD M. GREENE JR.
BY Nilsson, Robbins & Anderson
ATTORNEYS

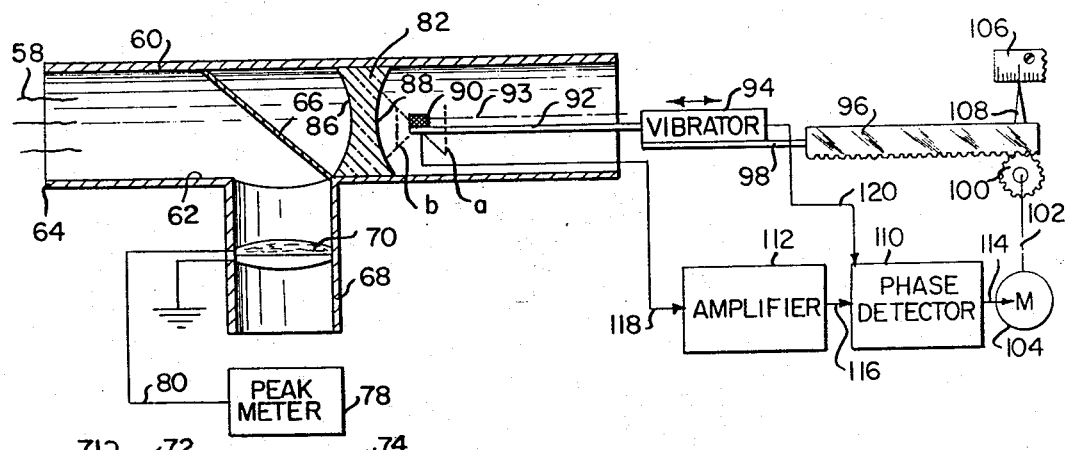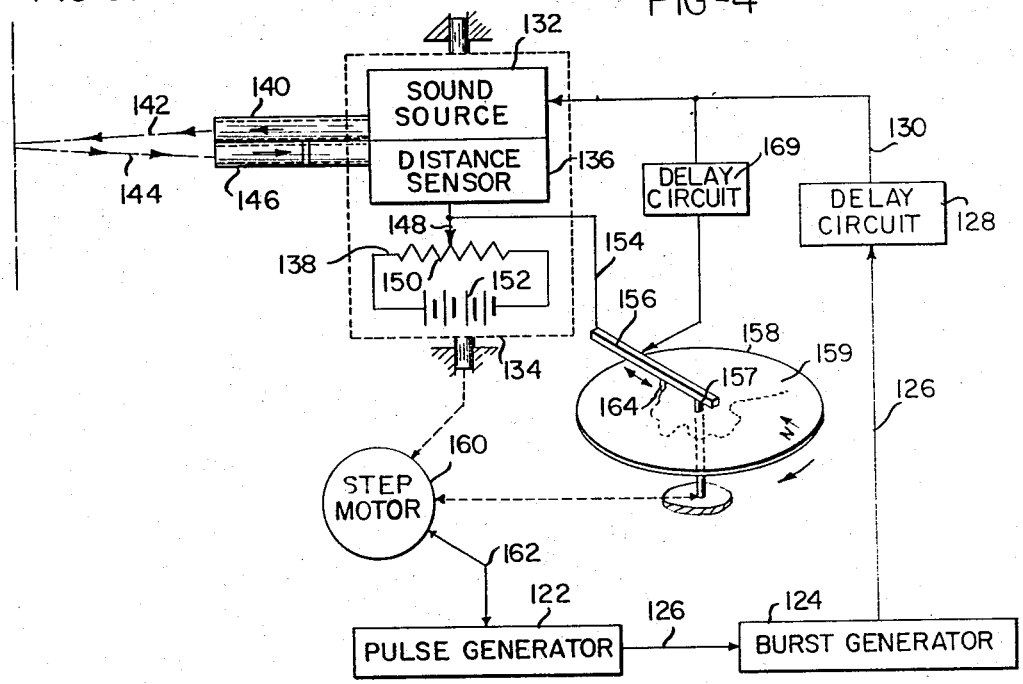

United States Patent Office 3,293,594
Patented Dec. 20, 1966

3,293,594
RADIATING ENERGY DETECTION SYSTEM
Howard M. Greene, Jr., 13812 Plummer St.,
Northridge, Calif. 90731
Filed Jan. 10, 1964, Ser. No. 337,009
5 Claims. (Cl. 340—1)

The present invention relates to a sensing system, as for example, wherein sound waves are sensed to manifest the presence of objects.

The need often arises to detect and manifest the presence of physical objects at a location somewhat remote from the object. That is, as examples, sonar systems are widely used in underwater work and submarines while radar is widely used both on the surface and in the air to detect and manifest the presence of nearby objects.

Characteristically, various forms of these systems transmit some form of energy, e.g. sound, or radio waves, which travels to the object-of-observation, and returns to system. The direction of the transmission is unconfined or known in advance. However, the distance to any proximate object is unknown. The distance information is then often provided by the system in a computation combining the established velocity of the transmitted energy with the time required for the energy to travel to the object and return.

Important as radar and sonar systems are in their many applications, including navigation, there remains a need for other types of detecting systems. For example, a need always exists for a system that can be embodied in a less-expensive operating unit. Furthermore, it is sometimes desirable to avoid transmitting energy that can itself be detected, as is necessary for operation of many traditional detecting systems. Therefore, a need exists for an inexpensive passive detector.

In the use of radiating energy to operate a detector, there are some distinct advantages favoring sound energy. For example, sound transducers are inexpensive and simple to control. Furthermore, many objects containing or carrying machinery continually radiate sound, while other forms of energy are not so universally transmitted.

One of the problems in employing sound energy for detector systems in the past, has been the absence of devices to fully analyze received sound. Of course, the characteristic velocity of sound waves has often been linked with the operating philosophy of systems, just as sonic frequency has been variously employed in different systems. However, these two single characteristics have, for the most part, been responsible for the operation of prior detecting systems. Yet, sonic energy, as other forms of radiating energy, possesses additional characteristics. For example, radiating energy is conventionally considered to radiate in all directions from a source just as ripples radiate from a disturbance at the surface of calm water. As the wave front of such radiation energy grows ever larger, the radius of curvature of such wave front increases to reduce the degree of curvature. Thus, for example, by measuring the degree of curvature of a surface-disturbance ripple at any given location on calm water, the distance to the disturbance causing the ripple may be computed. In general, the present invention relates to the utilization of characteristics of this type in various detecting systems.

According to one form of the present invention, a form of radiating energy, e.g. sound, is sensed at a location remote its source to provide information relative the source, as the distance thereto, by analyzing a segment of the energy wave front to determine and manifest the degree of curvature of the front. The source of the radiating energy may take the form of an actual source, or may be a reflecting object which returns as an echo, energy emanating from the system. The invention encompasses various component elements and various systems as related to this concept.

An object of the present invention is to provide an improved detecting system and components therefor.

Another object of the present invention is to provide an improved detection system utilizing radiating energy which system may be economically constructed and easily maintained.

Still another object of the present invention is to provide a detection system that is static and need not radiate easily-detected energy.

A further object of the present invention is to provide an improved short-range detection system utilizing sound energy.

Still a further object of the present invention is to provide improved elements for use in sonic systems, as in detection apparatus.

One further object of the present invention is to provide a system of detection wherein the curvature of the wave front from radiating energy is sensed to manifest information relative the source of the energy.

These and other objects will become apparent from a consideration of the following, taken in conjunction with the appended drawings, wherein:

FIGURE 1 is a diagrammatic view illustrating an application of the present invention as an altimeter;

FIGURE 2 is a diagrammatic representation of a system constructed in accordance with the present invention;

FIGURE 3 is a diagrammatic representation of another system constructed in accordance with the present invention;

FIGURE 3a is a fragmentary plan view of a part of FIGURE 3;

FIGURE 3b is a view similar to FIGURE 3a, wherein an alternative structure is employed; and FIGURE 4 is a diagrammatic representation of still another system constructed in accordance with the present invention.

Referring now to FIGURE 1 initially, there is shown a helicopter 10 hovering above the ground level 12. The aircraft carries an altimeter 14 (shown only as a symbol) which incorporates the present invention to manifest the distance from the aircraft to the ground.

In operation, the altimeter emits recurring sound wave fronts which for purposes of illustration are indicated to travel along a path 16. These wave fronts strike the ground and are reflected back as echo wave fronts (as indicated by dash lines 18).

As the wave fronts (indicated by lines 18) expand, they grow, defining an ever-larger sphere, and therefore, they have an ever-decreasing degree of curvature. That is, for example, the line 18a has a high degree of curvature, indicating it is close to the sound source, i.e. ground 12. However, the line 18b has much less curvature, and therefore is farther removed from the sound source, i.e. ground level 12.

Thus, the altimeter senses the degree of curvature of reflected sounds to manifest the altitude of the aircraft. As a result, an effective low-altitude altimeter, which may be economically manufactured as described below, is one form in which the present invention may be embodied.

Referring now to FIGURE 2, there is shown a detailed form of the altimeter 14. A sonic generator 20, which may comprise an oscillator connected to a speaker as well known in the prior art serves satisfactorily to provide a transmitted sound wave. Although various frequencies of sound may be satisfactorily employed, the fifteen to twenty thousand cycle range has been found effective.

The sonic generator provides sound, indicated by wavy lines 22, which may be keyed and which travels to a target (not shown) as the ground level 12 of FIGURE 1, and is reflected as sonic energy in echo form, indicated by the wavy lines 24. It is to be understood that the energy of lines 22 travels in a direction opposed to the energy of lines 24; however, for purposes of illustration, the direction is indicated to be similar in FIGURE 2. That is, the sound transmitter, e.g. sonic generator 20 emits energy in the opposite direction from that in which the receiver 26 is oriented to receive reflected energy. The two components are conventionally placed in close proximity as side by side.

The receiver 26 includes a channel 28 of cylindrical configuration, which terminates in a parabolic sonic reflector 30, which may be integrally formed therewith. The interior of the parabolic reflector 30 comprises a good sound reflecting surface 32, e.g. polished metal, while the interior surface 34 of the channel comprises a sound loss sink or sound deadening material, e.g. felt, fiberglass, and so on. This arrangement results in a relatively clean segment of the received wave front reaching the reflector.

In function the parabolic reflector 30 concentrates the received section of spherical arc along an axis 36, at a point dependent on the degree of curvature of the wave front energy received. That is, if the reflected-energy wave has a high degree of curvature, the energy is concentrated on the axis 36 near the reflector. However, if the curvature of the received energy is slight, the point of concentration is well removed from the reflector 30. Thus, the point of concentration, or "focal" point is related to the distance the wave front has travelled.

Mounted to traverse the axis 36 is a microphone 38 held on a bracket 40 which is carried on a spur wheel 42 the teeth of which mesh with a rack 44 that is fixed relative the parabolic reflector 30. The spur wheel 42 also carries an indicator 46 which, along with the bracket 40 is fixed against rotation by engagement with a scale 48 relative which it may freely slide. The scale 48 parallels the rack 44 and carries indications in units of linear measure, e.g. feet, upon which is manifest the distance to a surface that is detected as having reflected the sound wave.

The spur wheel 42 is connected for rotational drive to a motor 50 that is servo controlled by a peak-seeking servo system 52. The motor 50 is capable of revolution in both directions under control of the system 52, which receives a control signal through a signal path 54 from the microphone 38. In function, the peak-seeking servo provides two possible signals to the motor 50 via the line 56. If the signal from the microphone 38 provides an increasing-amplitude signal through the path 54, the system 56 provides a voltage to the motor causing it to continue to revolve in its present direction of travel. However, if the signal from the microphone becomes such that it is decreasing in amplitude, the voltage applied to the motor 50 is reversed, to reverse the direction of travel of the microphone.

For example, the motor may move the microphone closer to the reflector 30 when energized by a positive voltage, and drive the microphone away from the reflector upon energization by a negative voltage. In an exemplary form, the system may then comprise a well-known differentiator system which provides a positive output upon receiving a positive-going signal, and provides a negative output upon receiving a negative-going signal. The differentiator output is then applied to a clamp circuit which block the positive signal charges and through a coupling circuit to a relay which reverses the voltage applied to the motor 50 upon occurrence of each negative pulse. Of course, various other forms of peak-seeking servo-systems are well known in the prior art.

In the operation of the system of FIGURE 2, assume at the outset, that a burst of sonic energy is emitted from the generator 20, which travels to a remote target and a portion thereof is reflected back to the receiver 26 to be concentrated at a "focal" point someplace along the axis 36.

Assume initially that the "focal" point is nearer the reflector 30 than the current position of the microphone, which happens to be moving away from the reflector. Upon such an occurrence, the microphone provides a negative-going signal to the system 52 which in turn has been driving the motor with a negative signal. In such an instant situation, the servo system, sensing a negative-going signal, immediately reverses the voltage applied to the motor 50 to thereby move the microphone toward the reflector 30 resulting in a positive-going signal from the microphone 38.

The positive-going signal continues to command the movement of the microphone 38 toward the reflector 30 until the "focal" point of the sound is reached. Then, sensing a maximum, the microphone encounters less-intense sound and provides a diminishing signal. The result is that the motor 50 is again reversed. Therefore, the microphone reverses and oscillates about the "focal" point with every shallow excursion on either side thereof. In this manner, the indicator 46 is positioned on the scale to manifest the distance to the object that has reflected the transmitted sound.

Of course, various forms of well-known damped indicators may be employed for the indicator 46 to avoid apparent oscillations. Also, as is readily apparent, the scale 48 and the indicator 46 may be mounted at a location remote from the microphone 38 by using various metering or instrumentation techniques. Thus, the basic illustrative system as disclosed in FIGURE 2 may take a variety of forms to provide a simple, inexpensive detecting system useful as an altimeter.

In some instances, the need arises for a detector to be used on sound or other radiating energy which originates at the object of detection. For example a surface water craft may employ such apparatus to locate a fog horn, or various other structures from which a signal is emitted either as a beacon, or without intent as from motors or other machinery on another craft. Such a static system of the present invention, for performing that function, is considered below with reference to FIGURE 3.

In the system, radiating energy, e.g. sound is represented by wavy lines 58, which energy emanates from a nearby source, the proximity of which is desired. Assuming the example of sound energy, the sonic wave front is received in a cylindrical chamber 60, the intense surface 62 of which is of sound deadening material.

Well into the chamber 60 from the receiving end 64, there is mounted a partial reflector 66 held at an angle of 45° with the axis of the cylindrical chamber 60. The reflector passes a portion of the sound energy entering the chamber, and reflects the other portion into a transverse chamber 68 containing a microphone 70.

The reflector structure 66 may take a variety of forms including, parallel bars 71 of reflective material, as shown in FIGURE 3a, with apertures 72 therebetween. The bars 71, in such a structure are formed of sound-reflective material to reflect a part of the total wave front, and permit another part to pass through the apertures 72.

Another alternative form for the reflector plate structure 66 is a perforated sheet 74 of reflecting material as shown in FIGURE 3b, with sound-passing perforations 75 therein. Other possible forms for the structure include a membrane of material which is partially sound reflective and partly sound transmissive, and so on.

The reflected energy passing from the partial reflective structure 66 into the chamber 68 is sensed by the microphone 70 to energize a peaking meter 78 through a conductor 80. The meter 78 indicates the intensity of the received sound.

In using the system as shown in FIGURE 3, it is important that the sound indicated by line 58 emanate directly from the object under observation. Otherwise, echo energy may be employed which will result in an incorrect reading. Therefore, the system is first physically oriented so that the received sound energy is of maximum intensity. This is accomplished by variously directing the chamber 60 until a peak or maximum reading is observed on the meter 78.

It is also noteworthy that if the sound energy is great enough, in certain applications of the system, structures similar to the structure 66 may be used to separate the wave front for use on a plurality of sensors effectively ahead of the concentration point and behind it, whereby to eliminate undesired signals emanating from sources other than that under observation by cancellation.

With the system of FIGURE 3 oriented so that the sound energy represented by lines 58 is received directly from the object under observation, that portion of the energy passing through the partial reflecting structure 66 becomes of interest. Behind the structure 66, the energy strikes a concentrating or "focusing" element 82, which in this illustrative embodiment is a biconcave high-velocity-of-sound propagating material, e.g. iron which has opposed concave surfaces 86 and 88.

The sound energy in passing through the element 82 is refracted to converge at a concentration or "focal" point at the axial center of the chamber 60. Movably mounted to traverse the axial center is a sound sensor, e.g. microphone 90 carried on an arm 92 which is affixed to a vibrator 94 that imparts vibrating motion to the microphone 90 along the axial path 94 in the cylindrical chamber 60.

The vibrator 94 is affixed to a gear rack 96 by a bracket 98. The teeth of the rack 96 mesh with teeth of a spur wheel 100 which is linked by a mechanical connection represented by line 102 to a motor 104. The position of the rack 96 is thus set by the motor 104 variously driving the wheel 100, and that position is manifest on a scale 106 by a pointer 108 affixed to the gear rack.

The motor is electrically driven by a phase detector 110, energized through an amplifier 112 by the microphone 90. The electrical connections include: a conductor 114 between the motor 104 and the detector 110, a conductor 116 between the phase detector 110 and the amplifier 112, and a conductor 118 between the amplifier 112 and the microphone 90. The vibrator 94 may also be connected to the phase detector by a conductor 120.

Various forms of circuits which may be employed as the phase detector 110 are well-known which function to provide a signal capable of variation in both directions from a reference level to indicate the direction and extent of phase shift relative to a signal from a reference.

The servo motor 104 rotates in one direction or the other, depending upon the polarity of a received signal.

In the operation of the system, the sonic energy may be considered to be "focused" at a focal plane which separates two conical patterns of the energy. For example, the sound energy may be considered to be concentrated by converging at a point between plane positions $a$ and $b$. Of course at each of these positions the sound wave is somewhat spread, in the pattern of concentration and therefore the energy per unit of area is not as intense as it exists at the focal plane. Therefore, the vibrating element, i.e. the microphone 90 senses a signal which varies as it moves relative the focal plane or concentration point of the energy.

That is, the vibratory or oscillatory motion applied to the microphone 90 carries it between the position $a$ as shown, and the position $b$. As the element moves between the positions $a$ and $b$, the energy, from the object as sensed, is varied at a frequency substantially twice the frequency of the oscillating microphone because it alternately moves into the conical "beams" on either side of the focal plane. That is, assuming the microphone is at the focal point and moves away, the energy permitted to strike it decreases until it reaches position $a$. As the element moves toward the object, the energy increases to a maximum point (occurring as the microphone passes through the focal plane) then decreases to a minimum level as it reaches position $b$. Return to the focal plane by the microphone (completing one cycle) permits increased energy to be sensed.

As a result of the above consideration, it may be seen that when the microphone oscillates about the focal plane a double-frequency signal is formed to indicate that the object is focused at the plane. Now, if the object moves so that the focal plane is advanced, the microphone oscillates entirely in one energy cone, and therefore the frequency of the signal formed as a result of the energy impinging coincides to the frequency of the vibrator 94. This change to one-half the former frequency is detected by the phase detector 110 and formed into an analog signal in the conductor 114 to cause the motor 104 to position the microphone 90 to restore the dual energy-cone sensing position.

In this manner, the microphone 90 is maintained at the focal plane, or point of concentration of the sound energy to in turn similarly position the pointer 108 on the scale 106, as a result of the direct connection. Of course, that indication manifests the distance to the nearby sound source which is the subject of observation. Thus, distances to many objects which might otherwise remain concealed are accurately determined.

In the operation of the system the conductor 120 may be employed between the vibrator 94 and the phase detector 110, to establish a reference frequency for the phase detector. Of course, if a readily-available frequency is employed, as from the source of energy used, such a connection may be unnecessary.

In some instances, it is desirable to provide information relative all adjacent objects. For example, a ship moving within a harbor, or with a group of other ships at open sea may do so at times of very poor visibility. Under such circumstances accurate information on proximate objects all about the ship is exceedingly important to avoid collision. The present invention may be embodied in such a system, an illustrative embodiment of which will now be considered with reference to FIGURE 4.

In the system of FIGURE 4, bursts of sonic energy are sequentially transmitted in a circular pattern about the ship or other object carrying the system. After each burst is transmitted the system awaits an echo which will provide information on the proximity of the reflecting object. That information is then applied to a display apparatus, which manifests the ships or other installations, relationship to surrounding objects. Of course, if no object is present at a sufficiently-close range to provide an echo, no information is received however, explicit in such an occurrence is the information that no collision potential exists.

The operating sequence of the system is controlled by a pulse generator 122 which may take a variety of forms and operate at a variety of frequencies as well known in the prior art. However, in this regard, one arrangement employs a pulse generator operating to create sonic bursts of 20,000 cycles of 40 millisecond duration at approximately one second intervals.

Considering the system of FIGURE 4 further, the pulse generator 122 provides an energizing pulse to operate a burst generator 124 which may take the form of an oscillator the output of which is keyed or gated by the pulse received through conductor 126. The resulting burst of electrical energy from the generator 124 is applied through a conductor 126, a delay circuit 128 and a conductor 130 to a sound source 132 which may comprise a speaker or other sonic transducer for converting electrical oscillations into sound.

The sound source 132 is mounted on a revolving platform 134 along with a distance sensor 136 and an associated signal converter 138. The sound source directs radiating energy out of a directional passage 140 as represented by an outgoing line 142. The sonic energy so transmitted may then be reflected from a remote object in the form of an echo represented by a line 144. The echo energy is received through a directional passage 146 by the distance sensor 136, which may take a variety of forms for positioning an output element 148 in accordance with the degree of curvature of the received sonic wave front, as described in detail with reference to FIGURES 2 and 3.

The position of the element 148 is converted from a mechanical displacement signal into an equivalent electrical signal by tapping a proportionate voltage from a potentiometer. Specifically, the element 148 drives the movable contact of a potentiometer 150 which is connected across a battery 152. A conductor 154 then carries the electrical analog signal to a plotting arm structure 156. The rotatably-mounted plotting arm structure moves about a pivot 157 above a plotting plate 156, driven in a step fashion by connection to a step motor 160 which also drives the platform 134. The step motor is energized through a conductor 162 by the pulse generator 122, and various forms of step motors satisfactory for use herein are manufactured by Pace Controls Corporation, of Needham Heights, Massachusetts, and provide a predetermined rotational displacement upon receipt of an electrical pulse. The plotting plate 158 carries a paper 159, marked by an arm electrical stylus 164 carried in the plotting structure 156. In function the structure 156 displaces the stylus variously along its length, proportionate the amplitude of the signal received through the conductor 154. One exemplary form of the plotting arm structure comprises a lead-screw potentiometer as well known in the art, driven by a small motor to provide a signal which is compared with the signal in the conductor 154, until coincidence of amplitude occurs. Thus, the stylus 164 is positioned a distance from the center of the plotting plate 158 which is related to the amplitude of the received signal from the converter 138.

It is to be appreciated that the display structure as shown in FIGURE 4 may readily be replaced by cathode-ray display apparatus using well-known techniques common in the radar field; as well as other forms of display; however, the disclosed structure is simple, effective and economical in operation.

Considering the operation of the system of FIGURE 4, a sequence of operating events will now be described. Upon the provision of a pulse from the pulse generator 122, the step motor 160 advances the plotting arm structure 156 to a fresh position, and coincidently moves the platform 134 to orient the passages 140 and 146 in the same direction.

The pulse generator 122 also energizes the burst generator 124 to produce a brief signal of several oscillations which after a brief delay incurred by the delay circuit 128 passes to energize the sound source 132. This delay is provided to permit the system to become stable after the rotational movement of the mechanical elements.

On receiving the electrical burst, the sound source 132 transmits direction-oriented sonic energy, and assuming the presence of a nearby object, the energy is reflected as an echo having a wavefront characterized by a degree of curvature indicative of the distance to the nearby object. The received echo is then employed, as previously described to variously displace the element 148 to manifest the distance to the nearby object. As a result, an electrical analog of the distance is applied to the plotting arm structure 156 to position the stylus 164 a distance from the pivot 157 or center of the plotting plate 158 which is representative of the distance to the nearby object.

After a predetermined delay, which allows ample time for the stylus 164 to be properly positioned, a delay device 169 which may comprise a delay relay, supplies energy (the alternating signal) to the stylus 164 which marks the paper 159 carried on the plotting plate 158, with a dot. Thus, a readily visible and easily oriented display of the nearby object is manifest. The system then repeats the cycle to sense the presence of any object at the next step of directional orientation. This process is repeated, thereby providing a display of all nearby objects about the system.

It is to be noted that various techniques of use may be employed for the plotting plate 158. For example, when traveling with a group of ships, the concern over deviation from a selected course may only arise when an object indication enters a predetermined center section of the plotting plate. Therefore, the same paper 159 may remain on the plate for long intervals, with the result that an outside annular area thereon is marked to a point of complete confusion; however, marks inside that area would be readily apparent.

If the system is employed on a stationary location, e.g. a port director office, it may be desirable to replace the paper on the plate 138 to plot the locations of ships in the port at frequent intervals.

Of course, if a continuing display of all proximate objects in their precise location is desired, it will usually be advisable to employ a cathode-ray display system as previously described.

Thus, the system of the present invention in various forms is readily adapted to detect and manifest the location of remote objects. It is readily apparent that various forms of the system may be adapted in accordance with a knowledge of the art for use on surface installations, in the air, or beneath the water, and furthermore, that such installations may be stationary or movable. It is also apparent, that radiating energy of a broad frequency range may be utilized which energy may or may not be in the range classically designated as sonic.

Although various features and concepts of the present invention have been set forth in the foregoing illustrative embodiment, the present invention is not to be limited in accordance therewith, but is to be construed in accordance with the claims set forth below.

What is claimed is:

1. A ranging system for manifesting distance to a remote sound source, comprising:
    means for concentrating a segmental wavefront of sound radiated from said sound source to a focal point on a focal axis;
    a transducer for converting sonic radiation into an electrical energy signal;
    means for motivating said transducer along said focal axis whereby to position said transducer at said focal point at which sound from said source is concentrated;
    means for manifesting the position of said transducer to indicate distance; and
    direction sensing means, including a sound splitter to segregate a portion of said wavefront and sensing means for sensing said portion of said wavefront whereby to indicate a peak thereof.

2. A ranging system for manifesting distance to a remote sound source, comprising:
    focusing means for concentrating a segmental wavefront of sound radiated from said sound source to a focal point on a focal axis;
    a transducer for converting sonic radiation into an electrical energy signal;
    vibrating means for effectively vibrating said transducer through a pattern along said focal axis;
    means for motivating said transducer along said focal axis whereby to position said transducer at said focal point at which sound from said source is concentrated; and means for manifesting the position of said transducer to indicate distance.

3. A ranging system according to claim 2 further comprising plotting means for plotting a record of the position of said transducer to indicate distance.

4. A ranging system according to claim 2 wherein said vibrating means comprises means to impart vibrating motion to said transducer along said focal axis.

5. A ranging system according to claim 2 further comprising a source of sound for providing a remote object as said remote sound source by reflecting said sound therefrom.

References Cited by the Examiner

UNITED STATES PATENTS

| | | | |
|---|---|---|---|
| 2,349,370 | 5/1944 | Orner | 340—16 |
| 2,453,502 | 11/1948 | Dimmick | 178—6.8 |
| 2,643,339 | 6/1953 | Chu | 343—914 X |
| 2,699,834 | 1/1955 | O'Brien | 180—82.1 |
| 2,940,074 | 6/1960 | Watt | 343—11 |
| 3,054,898 | 9/1962 | Westover et al. | 250—83.3 |
| 3,218,909 | 11/1965 | Fain | 88—1 |

CHESTER L. JUSTUS, *Primary Examiner.*

R. A. FARLEY, *Assistant Examiner.*